United States Patent
Wang

(10) Patent No.: US 7,756,502 B2
(45) Date of Patent: Jul. 13, 2010

(54) HIGH-FREQUENCY IC AND GPS RECEIVER

(75) Inventor: Jianqin Wang, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 405 days.

(21) Appl. No.: 11/153,323

(22) Filed: Jun. 16, 2005

(65) Prior Publication Data

US 2006/0234667 A1    Oct. 19, 2006

(30) Foreign Application Priority Data

Feb. 10, 2005   (JP) ............................. 2005-034578

(51) Int. Cl.
   *H04B 1/10*       (2006.01)
(52) U.S. Cl. .................. 455/307; 455/333; 455/254; 455/266; 455/340
(58) Field of Classification Search ................ 455/307, 455/254, 266, 296, 333, 340
See application file for complete search history.

(56) References Cited

U.S. PATENT DOCUMENTS

| | | | | |
|---|---|---|---|---|
| 4,667,203 A * | 5/1987 | Counselman, III | ..... | 342/357.06 |
| 4,785,463 A * | 11/1988 | Janc et al. | ..... | 375/147 |
| 4,860,018 A * | 8/1989 | Counselman, III | ..... | 342/357.12 |
| 5,507,025 A * | 4/1996 | Rodeffer | ..... | 455/266 |
| 5,630,219 A * | 5/1997 | Matsuki et al. | ..... | 455/226.2 |
| 5,793,328 A * | 8/1998 | Ward et al. | ..... | 342/357.09 |
| 5,809,399 A * | 9/1998 | Tuutijarvi et al. | ..... | 455/63.1 |
| 5,821,898 A * | 10/1998 | Eerola et al. | ..... | 342/357.12 |
| 6,058,148 A * | 5/2000 | Whikehart et al. | ..... | 375/350 |
| 6,178,211 B1 * | 1/2001 | Whikehart et al. | ..... | 375/350 |
| 6,178,314 B1 * | 1/2001 | Whikehart et al. | ..... | 455/188.1 |
| 6,182,011 B1 * | 1/2001 | Ward | ..... | 701/213 |
| 6,289,041 B1 * | 9/2001 | Krasner | ..... | 375/152 |
| 6,408,245 B1 * | 6/2002 | An et al. | ..... | 701/216 |
| 6,501,944 B1 * | 12/2002 | Szydlowski et al. | ..... | 455/266 |
| 6,542,113 B2 * | 4/2003 | Fujii | ..... | 342/357.02 |
| 6,639,541 B1 * | 10/2003 | Quintana et al. | ..... | 342/18 |
| 6,674,401 B2 * | 1/2004 | McBurney et al. | ..... | 342/357.12 |
| 6,724,807 B1 * | 4/2004 | Krasner et al. | ..... | 375/143 |

(Continued)

FOREIGN PATENT DOCUMENTS

JP    63-5613    1/1988

(Continued)

OTHER PUBLICATIONS

Japanese Office Action dated Apr. 18, 2006 and partial English translation.

(Continued)

*Primary Examiner*—Edward Urban
*Assistant Examiner*—RuiMeng Hu
(74) *Attorney, Agent, or Firm*—McGinn IP Law Group, PLLC

(57) ABSTRACT

The high-frequency IC according to an embodiment of the invention includes a mixer down-converting the RF signal into an IF signal with a given center frequency lower than that of the RF signal, a first-order low-pass filter with a pass band set narrower than a bandwidth of the IF signal down-converted by the mixer, and an active low-pass filter removing a signal outside the bandwidth of the IF signal.

18 Claims, 2 Drawing Sheets

U.S. PATENT DOCUMENTS

| | | | |
|---|---|---|---|
| 7,151,759 B1* | 12/2006 | Ryan et al. | 370/332 |
| 7,197,089 B2* | 3/2007 | Najarian | 375/316 |
| 7,209,514 B2* | 4/2007 | Tanaka et al. | 375/150 |
| 7,355,535 B1* | 4/2008 | Anderson et al. | 341/106 |
| 2001/0049271 A1* | 12/2001 | Hirtzlin et al. | 455/188.1 |
| 2001/0050630 A1* | 12/2001 | Fujii | 342/357.02 |
| 2002/0028666 A1* | 3/2002 | Nakagawa et al. | 455/193.1 |
| 2002/0169578 A1* | 11/2002 | Yang | 702/152 |
| 2003/0017817 A1* | 1/2003 | Cowley | 455/323 |
| 2003/0139879 A1* | 7/2003 | Krasner | 701/213 |
| 2003/0216863 A1* | 11/2003 | Fielder | 701/213 |
| 2004/0042563 A1* | 3/2004 | Najarian et al. | 375/316 |
| 2004/0043745 A1* | 3/2004 | Najarian et al. | 455/334 |
| 2004/0049342 A1* | 3/2004 | Takano et al. | 701/213 |
| 2004/0072575 A1* | 4/2004 | Young et al. | 455/456.1 |
| 2004/0097211 A1* | 5/2004 | Dubash et al. | 455/285 |
| 2005/0114023 A1* | 5/2005 | Williamson et al. | 701/214 |
| 2006/0074558 A1* | 4/2006 | Williamson et al. | 701/213 |
| 2006/0119509 A1* | 6/2006 | Wang et al. | 342/359 |
| 2006/0154628 A1* | 7/2006 | Mochizuki | 455/134 |
| 2006/0227856 A1* | 10/2006 | Ledvina et al. | 375/150 |

FOREIGN PATENT DOCUMENTS

| | | |
|---|---|---|
| JP | 04170228 A * | 6/1992 |
| JP | 7-86529 | 9/1995 |
| JP | 8-222643 | 8/1996 |
| JP | 2003-240833 | 8/2003 |
| JP | 2003-347946 | 12/2003 |
| KR | 2002-0036921 | 5/2002 |
| KR | 10-2004-0024803 | 3/2004 |
| WO | WO 03/103168 A1 | 12/2003 |

OTHER PUBLICATIONS

Korean Office Action dated Sep. 27, 2006, with partial English translation.
Chinese Office Action dated Mar. 6, 2009 with English Translation.
Japanese Office Action dated Nov. 17, 2009 in JP Application No. 2005-034578 (with English translated excerpt).

* cited by examiner

HIGH-FREQUENCY IC AND GPS RECEIVER

BACKGROUND OF THE INVENTION

1. Field of the Invention

The present invention relates to high-frequency ICs and GPS receivers and, particularly, to a high-frequency IC suitable for a high-frequency front-end IC which converts a high-frequency signal into a baseband signal that is a low-frequency signal ranging from 0 Hz to several MHz, and a GPS receiver using the same.

2. Description of Related Art

Global Positioning System (GPS) navigation technology has been applied to consumer use and become widespread. Recent development of high-accuracy, high-speed positioning technology allows miniaturization of GPS receivers. This has enabled to incorporate GPS receivers into mobile terminals or the like with Ultra-Large-Scale Integration (ULSI) technology.

Following the implementation of the incorporation of GPS receivers into mobile terminals, Enhanced 911 Emergency Calling Systems (Wireless Enhanced 911 or E-911) that obligate communication common carriers to identify the calling location in the event of emergency call from mobile phones are introduced in the United States, and installation of GPS receivers into mobile phones is required. In Japan as well, as of 2007, mobile phones will be required to include GPS receivers as standard equipment. For these reasons, it is necessary not only to meet market needs such as size and cost reduction of GPS receivers but also to increase sensitivity so as to allow constantly accurate positioning.

The sensitivity of GPS receivers depends on both baseband signal processing technology and high-frequency IC technology. The baseband signal is a signal containing information, and it is a GPS signal in this specification. Presently, the baseband signal processing using Assisted-GPS (A-GPS) technology, which is called network-assisted positioning, provides a theoretical receiver sensitivity of −160 dBm. However, realization of this requires the technological development of high-frequency ICs.

There have been various configurations of high-frequency ICs for GPS receivers proposed. Normally, GPS receivers have a bandpass filter to enhance receiving selectivity. However, the bandpass limitation by bandpass filters causes loss of GPS signals, affecting the receiver sensitivity. To overcome this drawback, Japanese Unexamined Patent Publication No. 2003-240833 discloses a high-sensitivity GPS receiver that sets the bandwidth of an IF signal to 20 MHz or higher to improve the receiver sensitivity.

However, increasing the bandwidth of a bandpass filter to reduce GPS signal loss causes noise to increase. Since the performance of an automatic gain control (AGC) amplifier for amplifying GPS signals is predetermined, if the overall signal increases, the gain should be reduced accordingly. This can result in a decrease in the gain of GPS signals.

On the other hand, Japanese Examined Patent Publication No. H7-86529 discloses the GPS receiver with a low-pass filter of 450 kHz to remove the noise outside of the L1 GPS signal. However, this approach with a single low-pass filter cannot remove the noise from the signal to allow the sufficient SNR.

Therefore, it is required to increase the sensitivity for receiving GPS signals by calculating the ratio of a GPS signal to noise contained in an IF signal in detail while limiting the bandwidth of a bandpass filter to some extent.

As described above, improvement in the receiver sensitivity is demanded so as to accurately identify the position even if it is where GPS signal intensity is low such as indoors.

SUMMARY OF THE INVENTION

According to one aspect of the invention, there is provided an integrated circuit which outputs a digital signal according to a received signal. The integrated circuit includes a mixer down-converting the received signal into an intermediate frequency signal with a center frequency lower than that of the received signal; a first filter with a pass bandwidth narrower than a bandwidth of the intermediate frequency signal down-converted by the mixer; and a second filter removing a signal outside the bandwidth of the intermediate frequency signal. This integrated circuit enables to narrow down the pass band of the intermediate frequency signal by the first filter so that loss of the noise component is greater than loss of the signal component contained in the intermediate frequency signal. Gain of the intermediate frequency signal thereby increases, thus improving receiver sensitivity.

The present invention provides a high-frequency IC and a GPS receiver with improved sensitivity.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
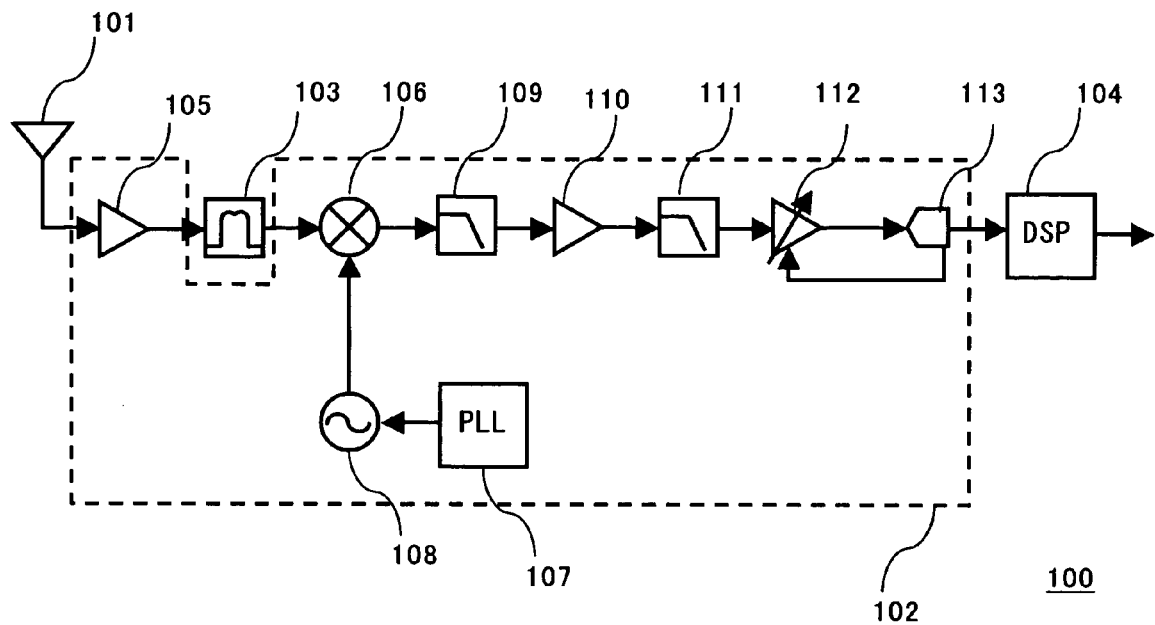
FIG. 1 is a view showing the configuration of a high-frequency IC for a GPS receiver according to an embodiment of the invention.

A GPS receiver of an embodiment of the invention is described hereinafter with reference to FIG. 1. FIG. 1 is a block diagram of a GPS receiver 100 of this embodiment. As shown in FIG. 1, the GPS receiver 100 has an antenna 101, low-noise amplifier 105, bandpass filter 103, mixer 106, phase locked loop (PLL) 107, local signal oscillator 108, first-order low-pass filter 109, IF preamplifier 110, active low-pass filter 111, variable gain amplifier (referred to hereinafter as AGC amplifier) 112, A/D converter 113, and digital signal processor (referred to hereinafter as DSP) 104.

Of the components described above, those other than the antenna 101, bandpass filter 103, and DSP 104 are integrated together as a high-frequency IC 102. In other words, the circuits subsequent to the antenna 101, bandpass filter 103, and DSP 104 are composed of external devices, other integrated circuits, and so on. This embodiment is different from conventional techniques in using a combination of the first-order low-pass filter 109 with a cutoff frequency of about 330 kHz and the active low-pass filter 111 with a cutoff frequency of about 2.5 MHz. The configuration of the GPS receiver of this embodiment is described below.

The antenna 101 receives an RF signal containing a GPS signal transmitted from a GPS satellite. The RF signal has a GPS signal superimposed with a carrier with a center frequency of 1575.42 MHz. The antenna 101 outputs the received RF signal to the low-noise amplifier 105.

The low-noise amplifier 105 amplifies the RF signal from the antenna 101 and outputs it to the bandpass filter 103. The bandpass filter 103 is externally connected to the high-frequency IC 102 and allows a specific frequency band of the received RF signal to pass through. The mixer 106 converts the RF signal having passed through the bandpass filter 103 into an IF signal having a lower center frequency than the RF signal, and outputs it to the first-order low-pass filter 109. The PLL 107 generates a reference signal. The local signal oscillator 108 is connected to the mixer 106. The local signal oscillator 108 generates a local frequency signal based on the reference signal output from the PLL 107.

The first-order low-pass filter 109 allows a specific frequency band of the IF signal from the mixer 106 to pass through. The IF preamplifier 110 amplifies the IF signal having passed through the first-order low-pass filter 109 and outputs it to the active low-pass filter 111. The active low-pass filter 111 allows a given frequency band of the IF signal amplified by the IF preamplifier 110 to pass through and outputs it to the AGC amplifier 112. The AGC amplifier 112 amplifies the IF signal having passed through the active low-pass filter 111. The gain obtained by this amplification is automatically controlled by the AGC amplifier 112. The A/D converter 113 converts the IF signal from the AGC amplifier 112 into a digital signal.

The operation of the high-frequency IC 102 having the above configuration is described hereafter. First, the antenna 101 receives RF signals transmitted from a plurality of GPS satellites. The RF signals include a GPS signal superimposed with a carrier with a center frequency of 1575.42 MHz. The RF signals are input to the low-noise amplifier 105 in the high-frequency IC 102.

The low-noise amplifier 105 amplifies the input RF signals and outputs the amplified RF signals to the bandpass filter 103. The bandpass filter 103 allows only given frequency band component of the amplified RF signals to pass through. The frequency band to pass through the bandpass filter 103 is described hereinafter with reference to FIG. 2.

Figure 2:
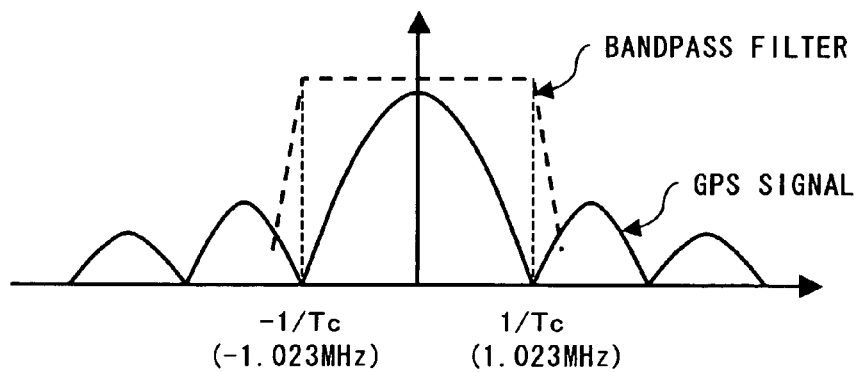
FIG. 2 is a graph showing the density distribution of an RF signal transmitted from a GPS satellite.

As shown in FIG. 2, the spectrum density of RF signals transmitted from GPS satellites has a main lobe existing in a center frequency of 1575.42 MHz and sub-lobes existing with a chip rate of 1.023 MHz. In this embodiment, the pass band of the bandpass filter 103 is set to 2.046 MHz or higher, such as 2.5. MHz, so as to cover the main lobe of the spectrum density of RF signals. Therefore, the RF signal with frequency component within a frequency band of +1.25 MHz from the center frequency 1575.42 MHz passes through the bandpass filter 103 in this embodiment.

The amplified RF signal having passed through the bandpass filter 103 is input to the mixer 106. Meanwhile, the local signal oscillator 108 generates a local frequency signal with a given frequency according to a reference signal from the PLL 107. The local signal oscillator 108 outputs the generated local frequency signal to the mixer 106.

The mixer 106 mixes the local frequency signal from the local signal oscillator 108 with the amplified RF signal having passed through the bandpass filter 103, thereby down-converting the amplified RF signal to generate an IF signal with a center frequency of 132 kHz and a frequency width of about 1.2 MHz, for example.

In this embodiment, the first-order low-pass filter 109 is placed between the mixer 106 and the IF preamplifier 110. The IF signal generated by the mixer 106 is input to the first-order low-pass filter 109. The first-order low-pass filter 109 passes the frequency component of the input IF signal with a frequency band lower than a specific frequency. This embodiment uses a first-order low-pass filter with a cutoff frequency of 330 kHz. Namely, the first-order low-pass filter has the pass bandwidth (330 kHz) narrower than a bandwidth of the down-converted IF signal (1.2 MHz). The setting of the cutoff frequency of the first-order low-pass filter 109 is detailed later.

The IF signal having passed through the first-order low-pass filter 109 is input to the IF preamplifier 110. The IF preamplifier 110 amplifies the input IF signal and outputs the amplified IF signal to the active low-pass filter 111.

The active low-pass filter 111 placed in the subsequent stage of the IF preamplifier 110 functions also as an anti-aliasing filter of the A/D converter 113 and limits the bandwidth of the input IF signal. It prevents signal distortion, called aliasing, which occurs in sampling, reduces the effect of unnecessary interfering wave, and increases receiving selectivity. The high-order active low-pass filter 111 removes the residual noise or the like unremoved by the first-order low-pass filter 109.

The active low-pass filter 111 allows the frequency component of the IF signal from the IF preamplifier 110 which is lower than a specific frequency to pass through. This embodiment uses an eighth-order low-pass filter with a cutoff frequency of 2.5 MHz as the active low-pass filter 111. Therefore, the eighth-order low-pass filter removes the noise signal outside the band of the IF signal.

The IF signal having passed through the active low-pass filter 111 is input to the AGC amplifier 112. The AGC amplifier 112 automatically controls the gain of the low frequency amplifier so as to demodulate the signal stably even if the intensity of the RF signal from the antenna 101 varies. Therefore, the IF signal input to the A/D converter 113 is kept to a constant level even if the RF signal from the antenna 101 varies in intensity. This allows the A/D converter 113 to operate with the effective number of bits as designed without any change.

The A/D converter 113 converts the input analog IF signal into a digital IF signal. The IF signal converted by the A/D converter 113 is input to the DSP 104.

The DSP 104 tracks the RF signal based on the input IF signal and the reference signal from the PLL 107, demodulates orbit data, and calculates the positional relationship between the GPS satellite and the received position of the RF signal. A conventional DSP for a GPS receiver with a normal sampling speed may be used for the DSP 104.

Of the components of the GPS receiver 100, the bandpass filter 103, low-noise amplifier 105, mixer 106, PLL 107, local signal oscillator 108, first-order low-pass filter 109, IF preamplifier 110, active low-pass filter 111, and AGC amplifier 112 are configured as an IF signal processor which down-converts the RF signal with a high center frequency of 1575.42 MHz received by the antenna 101 into an IF signal with a low center frequency of 132 kHz, for example, so as to facilitate digital processing.

A baseband LSI composed of the DSP 104 or the like stably acquires the GPS signal in the IF signal from the digital signal input from the A/D converter 113 using a correlator or the like. The control signal for controlling the amplification degree of the AGC amplifier 112 is generated from an average pulse width of the output digital signal of the A/D converter 113.

The high-frequency IC 102 of the present embodiment is described hereinafter. The high-frequency IC 102 of this embodiment is different from a conventional one in that the first-order low-pass filter 109 is placed in the previous stage of the IF preamplifier 110. In order to obtain the highest sensitivity in this embodiment, it is necessary to reduce noise of the IF signal output from the mixer 106 in the analog signal before being input to the AGC amplifier 112 so as to avoid attenuation of GPS signal component as much as possible. Thus, the setting for the cutoff frequency of the first-order low-pass filter 109 is described below. The configuration of the high-frequency IC 102 for a low-IF receiver where the center frequency of an IF signal is 132 kHz is described in the following example.

Figure 3:
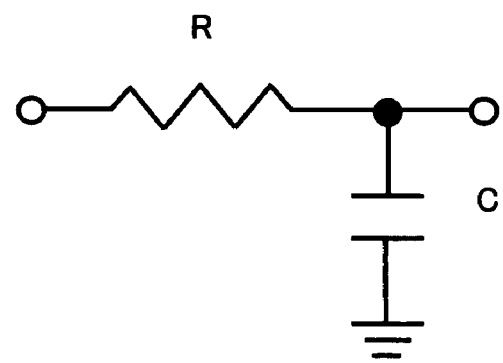
FIG. 3 is a circuit diagram showing an example of a first-order low-pass filter.

FIG. 3 is a circuit diagram showing an example of the first-order low-pass filter 109 of this embodiment. An RC low-pass filter as shown in FIG. 3, for example, may be used for the first-order low-pass filter 109. In this case, if resistance is R and capacitance is C, a cutoff frequency fc and a voltage gain VGain of the low-pass filter can be calculated, from transfer characteristics, by the following formulas:

$$fc = \frac{1}{2\pi RC} \quad (1)$$

$$VGain = \frac{1}{\sqrt{1 + (2\pi fRC)^2}} \quad (2)$$

In this embodiment, the center frequency of an IF signal is 132 kHz. Thus, the cutoff frequency of the first-order low-pass filter 109 is never set to 132 kHz or lower, and it is thus assumed that no loss of signals (noise and GPS signal) occurs below 132 kHz. Further, the eighth-order active low-pass filter 111 with a cutoff frequency of 2.5 MHz or higher is placed in the subsequent stage. Therefore, it is also assumed that the IF signal with a frequency of 2.5 MHz or higher is not input to the AGC amplifier 112. Under these conditions, loss of noise and a GPS signal in the first-order low-pass filter 109 is calculated.

Loss of noise or thermal noise loss is represented by LN and loss of the GPS signal contained in an IF signal or GPS signal loss is represented by LS. The spectrum density of a GPS signal which depends on frequency or GPS signal density is represented by S(f). The thermal noise loss LN and the GPS signal loss LS occurring when incorporating the first-order low-pass filter 109 into the high-frequency IC 102 can be calculated by the following formulas:

$$\text{Thermal noise Loss } LN = \int_{132\text{KHz}}^{2.5\text{MHz}} (1 - VGain) df \quad (3)$$

$$GPS \text{ Signal Density } S(f) = Tc \left\{ A \frac{\sin(\pi f Tc)}{\pi f Tc} \right\}^3 \quad (4)$$

$$GPS \text{ Signal loss } LS = \frac{\int_{132\text{KHz}}^{2.5\text{MHz}} S(f) \cdot VGain(f) df}{\int_{132\text{ KHz}}^{2.5\text{MHz}} S(f) df} \quad (5)$$

Formulas 3 to 5 show that, in the analog aspect, signal noise ratio (SNR) varies by the presence of the first-order low-pass filter 109. If the variation in SNR, ΔSNR, is represented by decibels (dB), the following formula is given.

$$\Delta SNR(\text{dB}) = LN(\text{dB}) - LS(\text{dB}) \quad (6)$$

The calculation result of the above formula shows that the lower the cutoff frequency of the first-order low-pass filter 109 is set, the greater the value of SNR is. If the cutoff frequency is lowered, the loss of the GPS signal contained in the IF signal increases, but the loss of noise increases more significantly. The gain of the AGC amplifier 112 thereby increases and the gain of the GPS signal also increases. Further, since the GPS signal is distributed nonuniformly, if the cutoff frequency is set lower, the ratio of the GPS signal to noise increases relatively. The value of SNR increases accordingly.

However, the increase in SNR does not necessarily lead to an increase in receiver sensitivity since loss of the GPS signal itself increases also. The solution for increasing the receiver sensitivity at maximum can be obtained by comparing the GPS signal loss with a SNR variation ΔSNR. A variation in receiver sensitivity, ΔSensitivity, due to the presence of the first-order low-pass filter 109 is defined by the following formula:

$$\Delta Sensitivity(\text{dB}) = \Delta SNR(\text{dB}) - LS(\text{dB}) \quad (7)$$

This formula shows that the greater the value of ΔSensitivity is, the higher the sensitivity of a GPS receiver becomes.

Figure 4:
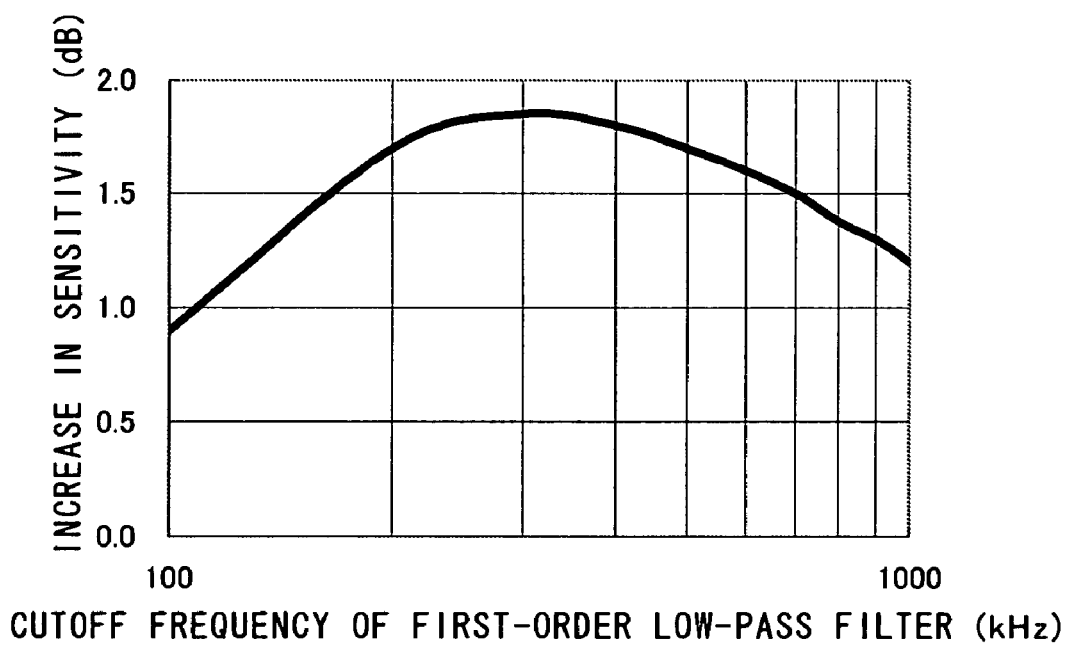
FIG. 4 is a graph showing the relationship between a cutoff frequency and a receiver sensitivity of a first-order low-pass filter.

FIG. 4 shows the result of the actual calculation based on the above theoretical model. In the graph of FIG. 4, the horizontal axis indicates a cutoff frequency (kHz) of the first-order low-pass filter 109 and the vertical axis indicates an increase in receiver sensitivity (dB). The graph shows that an increase in receiver sensitivity is maximum when the cutoff frequency of the first-order low-pass filter 109 is set to 330 kHz. Thus, the receiver sensitivity can be improved by setting the cutoff frequency of the first-order low-pass filter 109 to a value of the center frequency of IF signal plus 200 kHz.

If the cutoff frequency is too low, an increase in receiver frequency decreases. The increase in receiver frequency also decreases if the cutoff frequency is too high.

In the high-frequency IC 102 for a low-IF receiver where an IF signal is 132 kHz, the first-order low-pass filter 109 with a cutoff frequency of about 330 kHz is placed in the previous stage of the IF preamplifier 110. Thus, in FIG. 3, R is 4 KΩ and C is 120 pF. The actual experimental result also shows that receiver sensitivity increases by about 2 dB compared with the case where the first-order low-pass filter 109 is not placed, which almost corresponds to the theoretical result.

Though the above description describes the case where the first-order low-pass filter 109 and the active low-pass filter 111 are respectively placed in the previous and the subsequent stages of the IF preamplifier 110, it is not limited thereto. The same or similar effect in sensitivity can be obtained when the first-order low-pass filter 109 with a low cutoff frequency is placed in any positions after the mixer 106 in the IF signal processor.

Further, though the above description describes the case of using a low-IF signal with a center frequency of 132 kHz, it is also not limited thereto. The above calculation results may be applied to IF signals with other center frequencies. Use of a filter with the pass band of the range of ±200 kHz from the center frequency of IF signal can provide the same or similar increase in sensitivity.

It is therefore feasible to use a bandpass filter. In this case, a bandpass filter which allows a signal with a frequency band of ±200 kHz from the center frequency of the IF signal is used as described above. Thus, a bandpass filter with a bandwidth of 400 kHz is used. This allows increasing the sensitivity of the GPS receiver 100. For example, a high-frequency IC with an IF signal of 2.046 MHz or higher is also applicable. In this case, a combination of a first-order bandpass filter with a bandwidth of 400 kHz and a conventional high-order bandpass filter with a bandwidth of about 2.5 MHz is used.

As described in the foregoing, the present invention achieves improvement in receiver sensitivity by using a combination of a filter having a pass band set narrower than a bandwidth of IF signals, which is 2.046 MHz, for example, the bandwidth of a down-converted IF signal being 1.2 MHz in the above embodiment, and a filter having a normal bandwidth for an IF signal processor of a high-frequency IC for a GPS receiver.

It is apparent that the present invention is not limited to the above embodiment that may be modified and changed without departing from the scope and spirit of the invention.

What is claimed is:

1. An integrated circuit outputting a digital signal according to a received global positioning satellite (GPS) signal, comprising:
    a mixer down-converting the received GPS signal into an intermediate frequency signal with a center frequency lower than that of the received signal;
    a first filter with a pass bandwidth narrower than a bandwidth of the intermediate frequency signal down-converted by the mixer to receive the intermediate frequency signal and to filter the intermediate frequency signal;
    a second filter removing a signal outside a band of the intermediate frequency signal configured to filter the intermediate frequency signal after the intermediate frequency signal is filtered by the first filter; and
    a preamplifier between the first filter and the second filter, said preamplifier amplifying the intermediate frequency signal,
    wherein the pass bandwidth of the first filter is selected based on improving a sensitivity of the integrated circuit defined by:
        $\Delta$Sensitivity=$\Delta$SNR-LS, and
    wherein:
        $\Delta$Sensitivity represents a variation of the sensitivity of the integrated circuit,
        $\Delta$SNR represents a SNR variation, and
        LS represents a signal loss of the first filter.

2. The integrated circuit of claim 1, wherein the pass band of the first filter is determined based on a ratio of loss of signal component to loss of noise component contained in the intermediate frequency signal.

3. The integrated circuit of claim 1, wherein the first filter comprises a low-pass filter, and a cutoff frequency of the first filter is a value of adding 200 kHz to the center frequency of the intermediate frequency signal.

4. The integrated circuit of claim 2, wherein the first filter comprises a low-pass filter, and a cutoff frequency of the first filter is a value of adding 200 kHz to the center frequency of the intermediate frequency signal.

5. The integrated circuit of claim 1, wherein the first filter comprises a bandpass filter, and the pass band of the first filter is 400 kHz.

6. The integrated circuit of claim 2, wherein the first filter comprises a bandpass filter, and the pass band of the first filter is 400 kHz.

7. The integrated circuit of claim 1, wherein the preamplifier functions as an anti-aliasing filter.

8. The integrated circuit of claim 1, further comprising a variable gain amplifier connected to the second filter, wherein the variable gain amplifier automatically controls a gain of the intermediate frequency signal that has passed through the second filter.

9. The integrated circuit of claim 1,
    wherein the intermediate frequency signal is outputted from the integrated circuit as the digital signal after passing through the first filter and the second filter, and
    wherein a signal contained in the received signal is acquired from the digital signal.

10. The integrated circuit of claim 1, wherein the second filter is arranged to remove the signal outside the band of the intermediate frequency signal after the intermediate frequency signal passes through the first filter.

11. A method of outputting a digital signal according to a received signal, comprising:
    down-converting a received global positioning satellite (GPS) signal into an intermediate frequency signal with a center frequency lower than that of the received signal;
    filtering the intermediate frequency signal after down-converting the received GPS signal through a pass bandwidth narrower than a bandwidth of the intermediate frequency signal; and
    removing a signal outside a band of the intermediate frequency signal after filtering the intermediate frequency signal,
    wherein the pass bandwidth is selected based on improving a sensitivity of an integrated circuit, defined by:
        $\Delta$Sensitivity=$\Delta$SNR-LS, and
    wherein:
        $\Delta$Sensitivity represents a variation of the sensitivity of the integrated circuit,
        $\Delta$SNR represents a SNR variation, and
        LS represents a signal loss of a filter performing the filtering.

12. The method of claim 11, further comprising:
    amplifying the intermediate frequency signal having passed through a first filter after filtering the intermediate frequency signal and before removing the signal outside the band of the intermediate frequency signal; and
    amplifying the intermediate frequency signal having passed through a second filter after removing the signal outside the band of the intermediate frequency signal.

13. An integrated circuit outputting a digital signal according to a received global positioning satellite (GPS) signal, comprising:
    a mixer down-converting the received GPS signal into an intermediate frequency signal with a center frequency lower than that of the received GPS signal;
    a first filter with a pass bandwidth narrower than a bandwidth of the intermediate frequency signal down-converted by the mixer to receive the intermediate frequency signal and to filter the intermediate frequency signal; and
    a second filter removing a signal outside a band of the intermediate frequency signal configured to filter the intermediate frequency signal after the intermediate frequency signal is filtered by the first filter,
    wherein the pass bandwidth of the first filter is selected on a basis of a sensitivity of the integrated circuit obtained by comparing a signal loss and a signal to noise ratio (SNR) variation in the first filter,
    wherein the sensitivity of the integrated circuit is defined by:

ΔSensitivity=ΔSNR-LS, and wherein ΔSensitivity represents a variation of the sensitivity of the integrated circuit, ΔSNR represents the SNR variation, and LS represents a signal loss of the first filter.

14. The integrated circuit of claim 13, wherein the intermediate frequency signal is outputted from the integrated circuit as the digital signal after passing through the first filter and the second filter, and
wherein a signal contained in the received signal is acquired from the digital signal.

15. The integrated circuit claim 13, wherein the second filter is arranged to remove the signal outside the band of the intermediate frequency signal after the intermediate frequency signal passes through the first filter.

16. The integrated circuit of claim 13, wherein the first filter comprises a low-pass filter, and a cutoff frequency of the first filter is a value of adding 200 kHz to the center frequency of the intermediate frequency signal.

17. A method of outputting a digital signal according to a received global positioning satellite (GPS) signal, comprising:
down-converting the received GPS signal into an intermediate frequency signal with a center frequency lower than that of the received signal;
filtering the intermediate frequency signal after down-converting the received GPS signal through a pass bandwidth narrower than a bandwidth of the intermediate frequency signal; and
removing a signal outside a band of the intermediate frequency signal after filtering the intermediate frequency signal,
wherein the pass bandwidth is selected based on a sensitivity of an integrated circuit obtained by comparing a signal loss and a signal to noise ratio (SNR) variation in the filtering of the intermediate frequency signal, and
wherein the sensitivity of the integrated circuit is defined by:
ΔSensitivity=ΔSNR-LS, and
wherein ΔSensitivity represents the variation of the sensitivity of the integrated circuit, ΔSNR represents the SNR variation, and LS represents the signal loss of a filter performing the filtering.

18. The method of claim 17, further comprising:
amplifying the intermediate frequency signal having passed through a first filter after filtering the intermediate frequency signal and before removing the signal outside the band of the intermediate frequency signal; and
amplifying the intermediate frequency signal having passed through a second filter after removing the signal outside the band of the intermediate frequency signal.

* * * * *